United States Patent [19]

Naarmann et al.

[11] Patent Number: 4,567,250
[45] Date of Patent: Jan. 28, 1986

[54] PREPARATION OF FINELY DIVIDED ELECTRICALLY CONDUCTIVE PYRROLE POLYMERS

[75] Inventors: Herbert Naarmann, Wattenheim; Walter Heckmann, Weinheim; Gernot Köhler; Petr Simak, both of Ludwigshafen, all of Fed. Rep. of Germany

[73] Assignee: BASF Aktiengesellschaft, Fed. Rep. of Germany

[21] Appl. No.: 631,947

[22] Filed: Jul. 18, 1984

[30] Foreign Application Priority Data

Jul. 19, 1983 [DE] Fed. Rep. of Germany ....... 3325892

[51] Int. Cl.$^4$ .................. C08G 73/20; H01B 1/12; C07D 207/30
[52] U.S. Cl. .................. 528/423; 252/500; 252/518; 252/519; 252/520; 526/258
[58] Field of Search ............... 252/500, 518, 519, 520; 526/258; 528/423

[56] References Cited

U.S. PATENT DOCUMENTS 4,401,545  8/1983  Naarman et al. .................. 252/500
4,468,291  8/1984  Naarman et al. .................. 204/72

FOREIGN PATENT DOCUMENTS

A2704726  1/1983  European Pat. Off. .

OTHER PUBLICATIONS

D. E. Weiss et al., Austr. J. Chem. (1963), pp. 1056, 1076 and 1096.
A. F. Diaz et al., J. Chem. Soc. Chem. Comm. (1979), p. 635.
K. C. Knulke and R. S. Mann, J. Polym. Sci. 20 (1982), pp. 1089-1095.
Synthetic Metals vol. 4 (1981) pp. 119-130.
Journal of Polymer Science vol. 20 (1982) pp. 1089-1095.

Primary Examiner—Paul Lieberman
Assistant Examiner—Robert A. Wax
Attorney, Agent, or Firm—Keil & Weinkauf

[57] ABSTRACT

Finely divided electrically conductive pyrrole polymers are prepared by a process in which the pyrroles, in solution and in the presence of a conductive salt, are treated with an oxygen-containing oxidizing agent. The finely divided conductive pyrrole polymers can be used for the production of moldings.

3 Claims, No Drawings

PREPARATION OF FINELY DIVIDED ELECTRICALLY CONDUCTIVE PYRROLE POLYMERS

The present invention relates to a process for the preparation of finely divided electrically conductive pyrrole polymers and to the use of these polymers for the production of moldings.

D. E. Weiss et al., Austr. J. Chem. (1963), pages 1056, 1076 and 1096, have disclosed that tetraiodopyrrole can be pyrolyzed, electrically conductive powders possessing high conductivities being produced.

According to A. F. Diaz et al., J. Chem. Soc. Chem. Comm. (1979), page 635, J. Chem. Soc. Chem. Comm. (1979), page 854 and ACS Org. Coat. Plast. Chem. 43 (1980), anodic polymerization of pyrrole in the presence of a conductive salt gives films having electrical conductivities of not more than $10^2$ S/cm. These are p-conductive polypyrroles, and the counter-anions are, in particular, $BF_4^-$, $AsF_6^-$, $ClO_4^-$ and $HSO_4^-$.

According to K. C. Khulke and R. S. Mann, J. Polym. Sci. 20 (1982), pages 1089–1095, pyrrole can be polymerized in aqueous solution in the presence of potassium persulfate so that the polymer separates out in the form of a finely divided black powder.

For many intended uses, for example for the production of electronic components, electrical switches, special electrode materials, etc., it is necessary or desirable to convert the electrically conductive finely pulverulent pyrrole polymers to the desired form for use by means of a further processing step. For example, before being used, pyrrole polymer powders generally have to be pressed to give appropriate moldings. According to the prior, previously unpublished German patent application P No. 3,277,914.0, finely divided pyrrole polymers can be converted to moldings by pressing at from 150° to 300° C. and under not less than 50 bar.

We have found that the properties of the finely divided pyrrole polymers available to date do not meet all requirements. In particular, the electrical conductivity is not sufficient.

It is an object of the present invention to provide novel finely divided electrically conductive pyrrole polymers which are more suitable for processing to moldings.

We have found that this object is achieved by a simple process in which compounds from the class consisting of the pyrroles, either alone or as a mixture with one another or with other compounds which are copolymerizable with pyrroles, in solution in the presence of a conductive salt, are treated with an oxygen-containing oxidizing agent.

The present invention furthermore relates to the use of these finely divided pyrrole polymers for the production of moldings.

The novel finely divided pyrrole polymers are highly electrically conductive systems which contain an oxygen-containing oxidizing agent or another conductive salt which is present. The conductivity is from $10^{-2}$ to 10, preferably from $10^{-1}$ to 5, in particular from 0 to 2.6, S/cm, the mean particle diameter can be from 0.05 to 5 mm, and the specific surface area is from 1 to ... $m^2/g$. The IR spectrum of the novel finely divided pyrrole polymers does not differ from that of the pyrrole polymers obtained by electrochemical anodic oxidation.

The novel finely divided pyrrole polymers may also be regarded as complexes of the ions and the polymeric pyrroles. The polymeric pyrroles of the invention possess good mechanical properties and a well balanced and improved spectrum of properties, in particular very good performance characteristics, which makes them suitable for the production of moldings.

The compounds from the class consisting of the pyrroles, which are suitable for the novel process, are pyrrole itself as well as substituted pyrroles, such as N-alkylpyrroles, N-arylpyrroles, pyrroles which are monoalkyl-suabstituted or dialkyl-substituted at the carbon atoms and pyrroles which are monohalogenated or dihalogenated at the carbon atoms. According to the invention, pyrrole can be used alone or as a mixture with other compounds from the class consisting of the pyrroles. Preferably, unsubstituted pyrrole itself is used. Where substituted pyrroles are employed, preferred compounds are the 3,4-dialkylpyrroles, in particular those where alkyl is of 1 to 4 carbon atoms, as well as the 3,4-dihalopyrroles, in particular 3,4-dichloropyrrole.

Small amounts, eg. from 0.1 to 10 moles per mole of pyrrole, of other heterocyclic compounds which contain a conjugated $\pi$-electron system, eg. furan, thiophene or thiazole, may also be present.

To produce the finely divided pyrrole polymers, the compounds from the class consisting of the pyrroles, in solution in the presence of a conductive salt, are treated with an oxygen-containing oxidizing agent. Advantageously, from 0.2 to 10 moles of the oxidizing agent are used per mole of pyrrole or of a mixture of pyrroles with one another or with other compounds which are copolymerizable with pyrroles. If less than 1 mole is used, it is found that some of the starting material used is not converted to polymer. It is not necessary to use larger amounts of oxidizing agent since the stated amount is sufficient to convert the total amount of starting materials to polymer. An excess over and above the stated amount is not necessary in most cases but can sometimes produce particular effects. Among the oxygen-containing oxidizing agents, those which have proven particularly useful are peroxo acids and their salts, and peroxodisulfuric acid and its alkali metal and ammonium salts. Peroxoborates or peroxochromates, eg. sodium perborate or potassium bichromate, are also preferably used. Permanganates, such as potassium permanganate, are also suitable if they are mixed with a small amount of acid. The use of hydrogen peroxide is also preferred, but when it is used a conductive salt must be present.

The finely divided pyrrolepolymers are prepared in solution, and water has proven useful as a solvent, if necessary mixed with an organic water-miscible solvent. However, it is also possible to use organic solvents, such as dimethyl sulfoxide, methylene chloride, methanol, ethanol, acetonitrile, sulfolane, ethylene carbonate, propylene carbonate, dioxane or tetrahydrofuran. Where an organic water-immisicible solvent is used, it has proven useful to incorporate small amounts of water as a fine dispersion in the organic solvent. Preferably, however, the finely divided pyrroles are prepared using water. In an advantageous procedure, the solution contains from 0.1 to 50, preferably from 1 to 5, % by weight of the pyrrole or of the mixture of pyrroles, with or without other compounds. The amount of oxidizing agent added is in accordance with the principle stated above. The reaction can advantageously be carried out at from 0° to 100° C., preferably from 15° to 40° C., but satisfactory results are generally obtained when it is carried out at room temperature.

Conductive salts are added to the solutions and, when the finely divided polymers separate out, these salts are incorporated into the polymer structure so that the conductivity of the resulting finely divided polymers is advantageously affected. These conductive salts are also referred to as complexing agents or doping agents. Examples of conductive salts which have proven useful are $KHSO_4$, $Na_2SO_4$, $HCOOH$, $LiClO_4$, $HClO_4$, $NEt_4ClO_4$, $NBu_4ClO_4$, $KAlF_3$, $NaAlF_6$, $KBF_4$, $K_2TiF_6$, $K_2ZrF_6$, $K_2NiF_4$, $HO_2(NO_3)_2$, $H_2SO_4$, $FeCl_3$, $NOPF_6$, $KAsF_6$ or $NaPF_6$. The concentration of the conductive salt is such that not less than 1 mole of one of the conductive salts listed above is used per 3 moles of the pyrrole employed or other monomers.

The novel finely divided pyrrole polymers, which may also be referred to as finely pulverulent pyrrole polymers, are particularly useful for the production of moldings. These moldings can be used as, for example, electrodes, catalysts, diaphragms, electrical storage systems, batteries, switches, semiconductor components, shielding materials and solar cells. In finely divided form, the novel pyrrole polymers can be used for the antistatic treatment of plastics.

Moldings can be produced using a conventional method in which the polymer is pressed under superatmospheric pressure and at elevated temperatures. For example, as can be seen from the prior, previously unpublished patent application, it has proven useful to carry out the procedure at from 150° to 300° C. and under not less than 50, preferably from 100 to 200, bar. If it is desired to modify the properties, it is sometimes advantageous to produce moldings by combining the novel finely divided pyrrole polymers with other nonconductive thermoplastics. In producing moldings, it is also possible to use the finely divided pyrrole polymers together with products having a higher conductivity.

The Examples which follow illustrate the invention. Parts and percentages are by weight.

EXAMPLE 1

An aqueous solution of $K_2S_2O_8$ is added slowly to a vigorously stirred solution of 3 parts of pyrrole and 1.5 parts of $KAlF_3$ in 100 parts of water in a stirred flask at room temperature. The molar ratio of pyrrole to $K_2S_2O_8$ is 6:1. After a short time, a black precipitate separates out. After a reaction time of 15 minutes, this precipitate is filtered off, washed neutral with water, washed with methanol and then dried for 8 hours under 0.5 mm Hg and at 50° C.

The finely pulverulent material has a mean particle diameter of 0.2 μm and a specific surface area of 15 m²/g.

This material is pressed to give a tablet, the conductivity of which is measured as 0.1 S/cm. The IR spectrum is recorded using a KBr pellet, and corresponds to that shown in FIG. 1.

The same amount of pyrrole and 1.5 parts of $KBF_4$ are treated with the same amount of $K_2S_2O_8$ at room temperature in a mixture of 1 part of water and 1 part of methanol. The same results as above are obtained.

EXAMPLE 2

Using the procedure described in Example 1, an aqueous solution is treated with an aqueous solution of $K_2Cr_2O_7$, 2 moles of $K_2Cr_2O_7$ being used per mole of pyrrole. The solution is acidified to pH 1 with dilute sulfuric acid and is stirred. The resulting black precipitate is washed and dried, these steps being carried out as described above.

The finely pulverulent material has a mean particle diameter of 0.1 μm and a specific surface area of 30 m²/g. The IR spectrum corresponds to that shown in FIG. 1.

EXAMPLES 3 to 13

50 parts of a 1:1 methanol/water mixture are added to 13.4 parts of pyrrole and a salt or acid is introduced in the amount stated in the Table, after which 47.6 parts of sodium peroxodisulfate in 100 parts of water are added at 20° C., while cooling with ice. The resulting powder is filtered off under suction and worked up as described in Example 1. The results of the process according to the invention are summarized in Table 1 below.

TABLE 1

| No. | Type | Additive Parts by weight | Specific electrical conductivity S/cm |
|---|---|---|---|
| 3 | 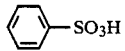 | 15.7 | 3.0 |
| 4 | $H_2SO_4$ | 10 | 2.0 |
| 5 | $KBF_4$ | 12 | 2.4 |
| 6 | $NaF$ | 8 | 1.4 |
| 7 | $KPF_6$ | 5 | 2.3 |
| 8 | $K_2IrF_6$ | 10 | 5.9 |
| 9 | $K_2SiF_6$ | 14.5 | 7.8 |
| 10 | $KALF_3$ | 13.2 | 2.3 |
| 11 | $K_3ALF_6$ | 16.5 | 3.5 |
| 12 | $K_2TiF_6$ | 5.5 | 6.8 |
| 13 | $K_2NiF_6$ | 10 | 8.5 |
| 14 | $K_2ZrF_6$ | 8 | 6.5 |

We claim:

1. A process for the preparation of a finely divided electrically conductive pyrrole polymer, wherein monomers from the class consisting of the pyrroles, in solution and in the presence of a conductive salt, are treated with an oxygen-containing oxidizing agent at a temperature of 0°–100° C. and at a concentration of not less than 1 mole of conductive salt per 3 moles of monomer.

2. A process according to claim 1, wherein the oxidizing agent used is a peroxo acid or one of its salts, or hydrogen peroxide, or peroxoborates or peroxochromates or permanganates.

3. A process according to claim 1 wherein the pyrroles comprise pyrrole, N-alkylpyrroles, N-arylpyrroles, pyrroles substituted at the carbon atoms with monoalkyl or dialkyl, and pyrroles monohalogenated or dihalogenated at the carbon atoms.

* * * * *